US010459577B2

United States Patent
Niikura et al.

(10) Patent No.: US 10,459,577 B2
(45) Date of Patent: Oct. 29, 2019

(54) VIDEO DISPLAY DEVICE AND MANIPULATION DETECTION METHOD USED THEREFOR

(71) Applicant: MAXELL, LTD., Kyoto (JP)

(72) Inventors: Takehiro Niikura, Tokyo (JP); Takashi Matsubara, Tokyo (JP); Naoki Mori, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/766,617

(22) PCT Filed: Oct. 7, 2015

(86) PCT No.: PCT/JP2015/078530
§ 371 (c)(1),
(2) Date: Apr. 6, 2018

(87) PCT Pub. No.: WO2017/060993
PCT Pub. Date: Apr. 13, 2017

(65) Prior Publication Data
US 2019/0065004 A1    Feb. 28, 2019

(51) Int. Cl.
*G06F 3/042*    (2006.01)
*G06F 3/041*    (2006.01)
(Continued)

(52) U.S. Cl.
CPC .......... *G06F 3/0425* (2013.01); *G06F 3/0416* (2013.01); *H04N 5/2256* (2013.01); *H04N 5/3532* (2013.01)

(58) Field of Classification Search
CPC ... G06F 3/0416; G06F 3/0425; H04N 5/2256; H04N 5/232; H04N 5/3532
See application file for complete search history.

(56) References Cited

U.S. PATENT DOCUMENTS

2002/0093666 A1    7/2002   Foote et al.
2005/0110964 A1*   5/2005   Bell .................. G06F 3/011
                                                353/122
(Continued)

FOREIGN PATENT DOCUMENTS

JP    2002-213947 A    7/2002
JP    2011-065511 A    3/2011
(Continued)

OTHER PUBLICATIONS

Search Report issued in corresponding International Patent Application No. PCT/JP2015/078530, dated Dec. 15, 2015.

*Primary Examiner* — Kwin Xie
(74) *Attorney, Agent, or Firm* — McDermott Will & Emery LLP

(57) ABSTRACT

A video display device includes first and second illuminators irradiating a manipulation surface with illumination light for manipulation detection in different directions, an imaging unit employing an imaging element of a rolling shutter system that images the irradiated manipulation surface together with a manipulation object of a user, and a contact point detecting unit detecting a contact point at which the manipulation object of the user touches the manipulation surface based on a captured image of the imaging unit. Captured images of shadows of the manipulation object of the user formed by repeatedly lighting up the first illuminator and the second illuminator alternately are used in a contact point detection process of the contact point detecting unit, and in the alternate lighting of the first illuminator and the second illuminator, a lighting period of one illuminator is longer than an imaging cycle of one frame of the imaging unit.

5 Claims, 19 Drawing Sheets

(51) Int. Cl.
*H04N 5/225* (2006.01)
*H04N 5/353* (2011.01)

(56) References Cited

U.S. PATENT DOCUMENTS

| | | | |
|---|---|---|---|
| 2005/0122308 A1* | 6/2005 | Bell | G06F 3/011 |
| | | | 345/156 |
| 2005/0162381 A1* | 7/2005 | Bell | G06F 3/011 |
| | | | 345/156 |
| 2012/0016230 A1 | 1/2012 | Kishima et al. | |
| 2013/0135260 A1 | 5/2013 | Damhaug et al. | |
| 2013/0300849 A1 | 11/2013 | Ono | |
| 2014/0125864 A1* | 5/2014 | Rihn | H04N 5/2256 |
| | | | 348/367 |
| 2014/0168085 A1* | 6/2014 | Huang | G06F 3/0216 |
| | | | 345/168 |
| 2014/0253512 A1 | 9/2014 | Narikawa et al. | |
| 2014/0253513 A1 | 9/2014 | Matsubara et al. | |
| 2014/0267031 A1* | 9/2014 | Huebner | G06F 3/0346 |
| | | | 345/158 |

FOREIGN PATENT DOCUMENTS

| | | |
|---|---|---|
| JP | 2011-239084 A | 11/2011 |
| JP | 2012-023492 A | 2/2012 |
| JP | 2012-068690 A | 4/2012 |
| JP | 2012-248992 A | 12/2012 |
| JP | 2014-517362 A | 7/2014 |
| JP | 2014-174832 A | 9/2014 |
| JP | 2014-174833 A | 9/2014 |
| WO | 2013/099942 A1 | 7/2013 |

* cited by examiner

FIG. 3
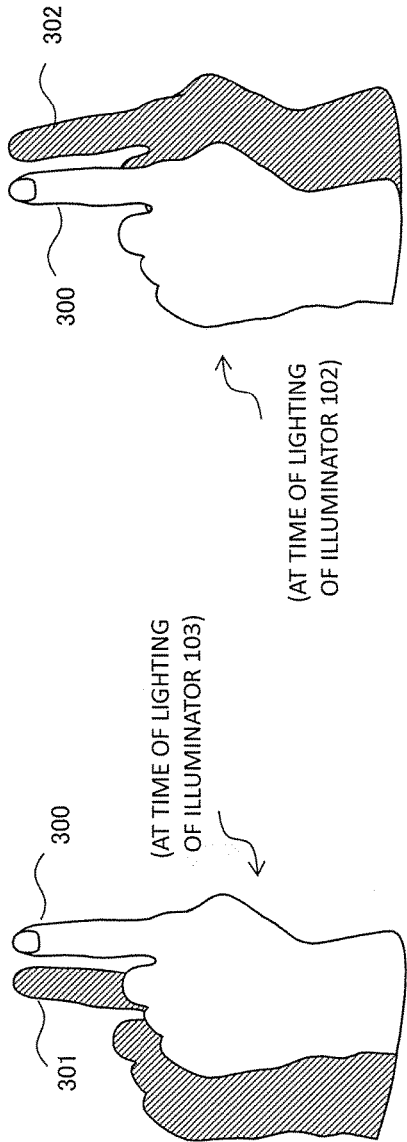
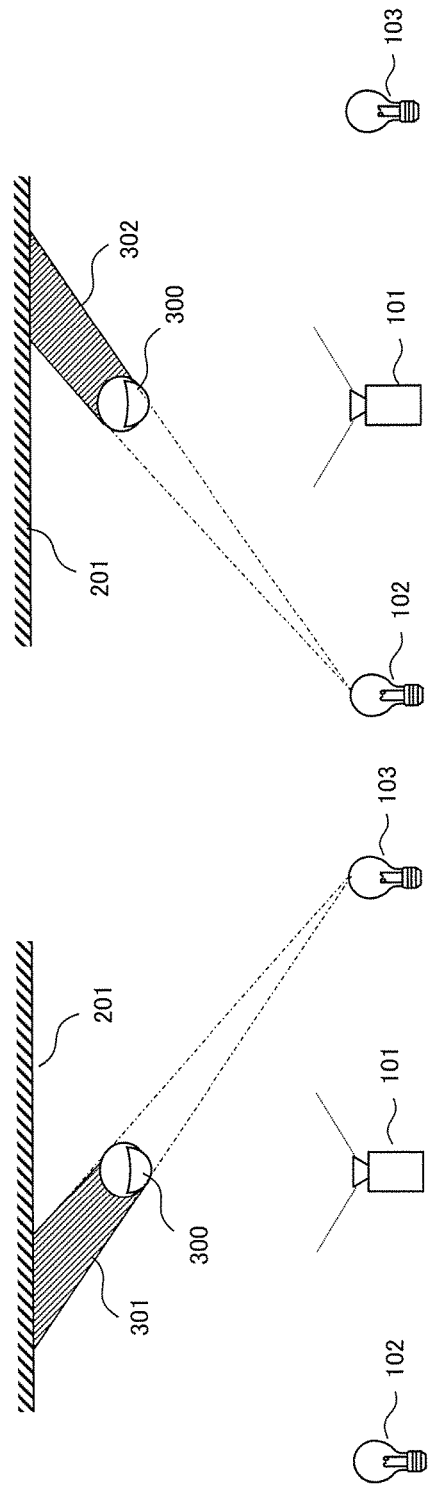

FIG. 16
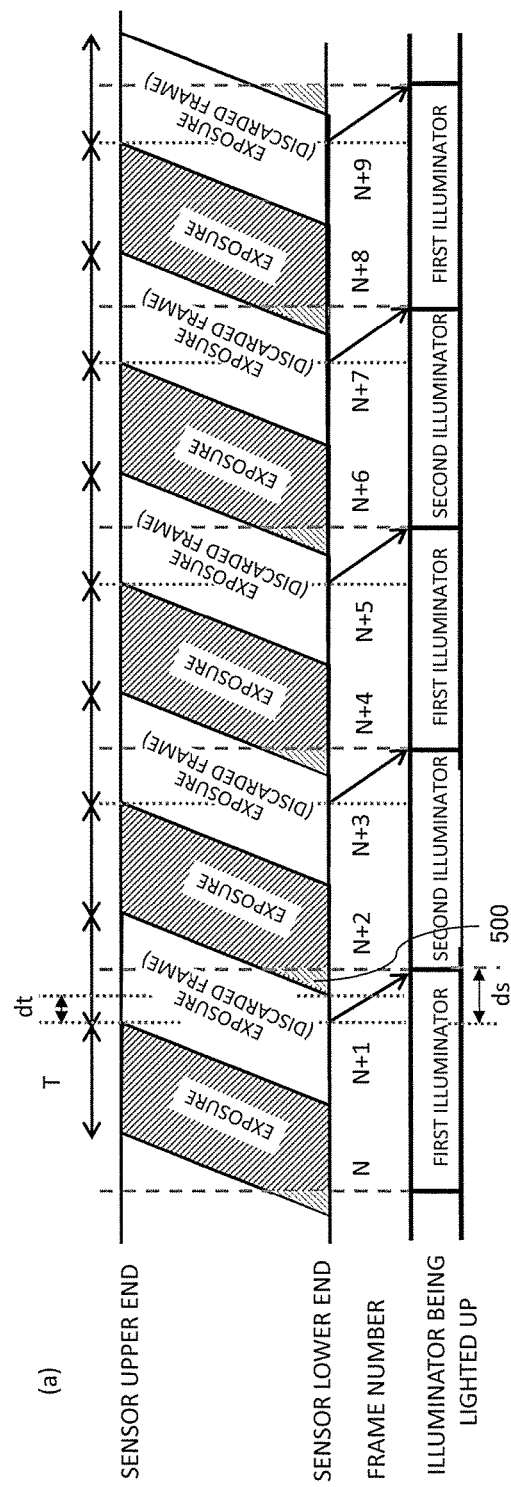
(a)
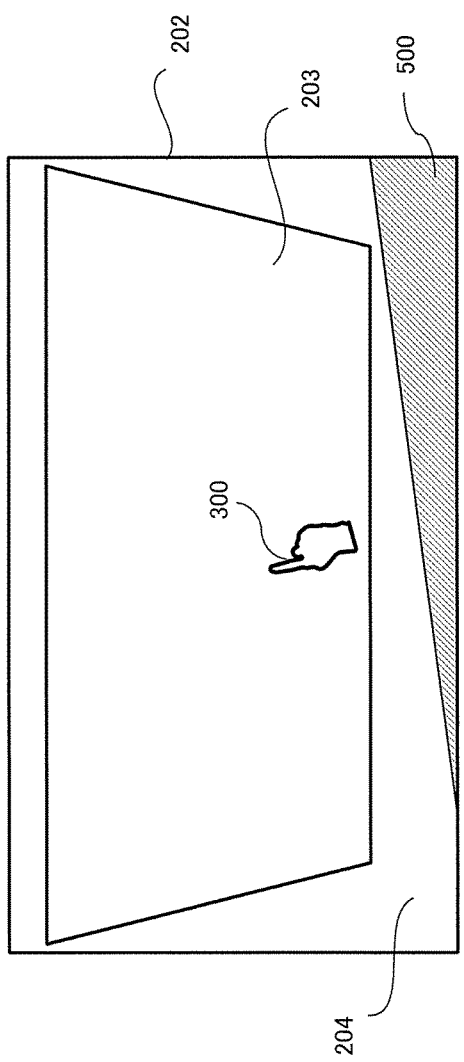
(b)

FIG. 18
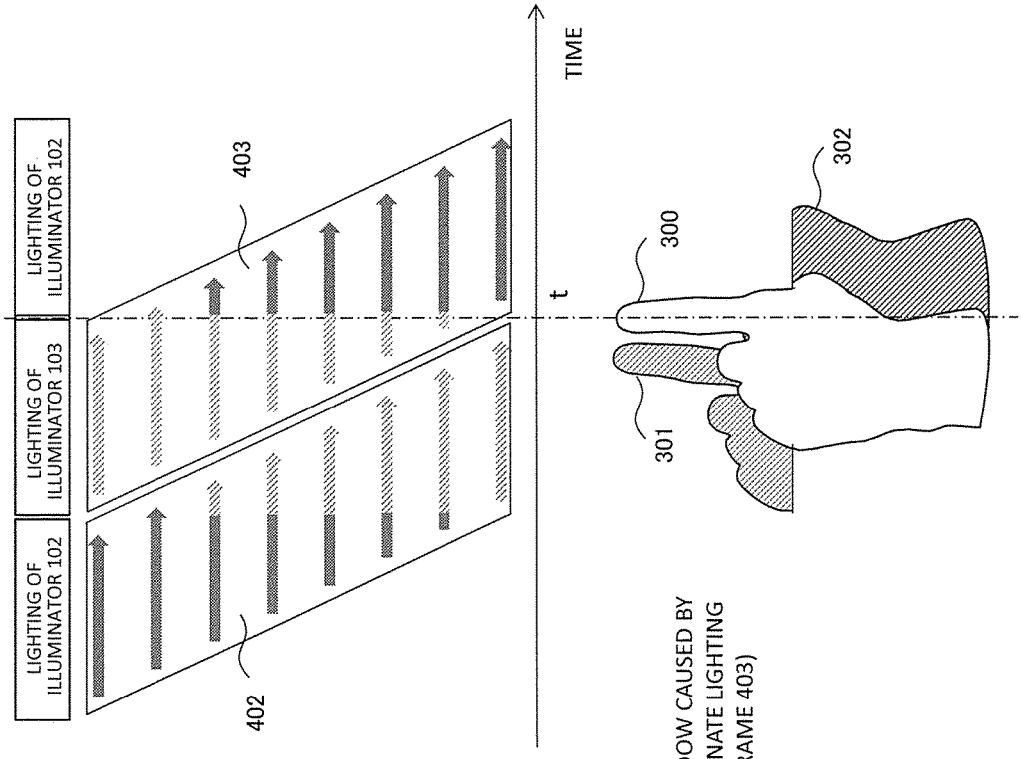
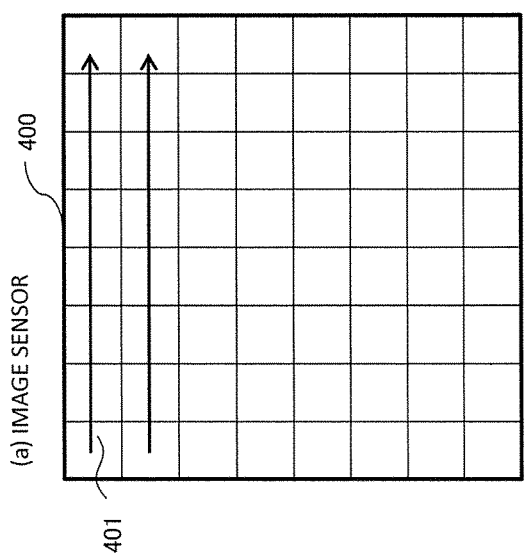

FIG. 19
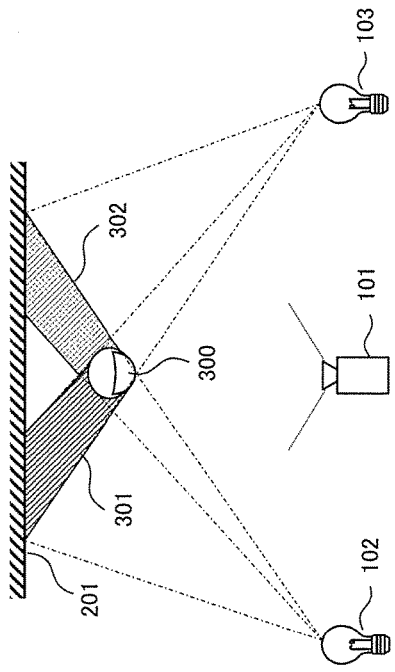
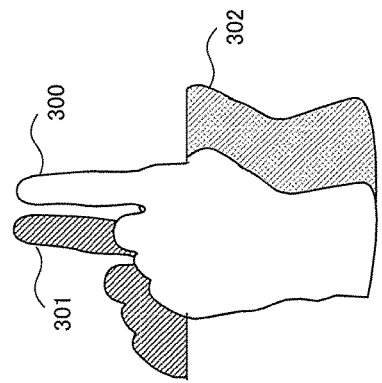
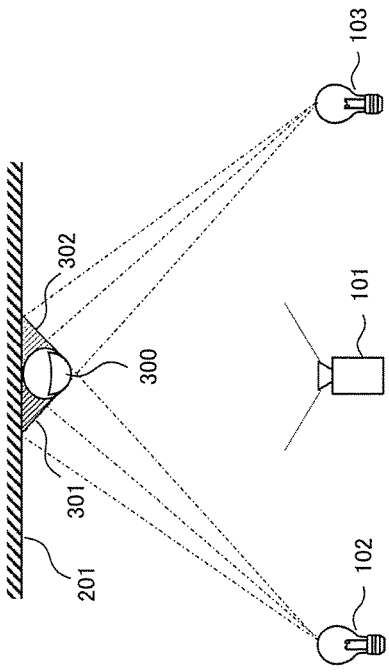
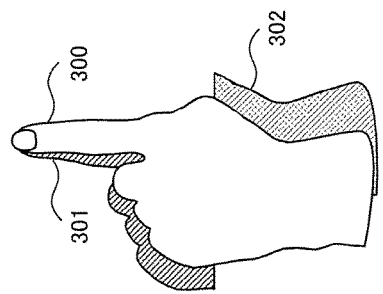

VIDEO DISPLAY DEVICE AND MANIPULATION DETECTION METHOD USED THEREFOR

CROSS REFERENCE

This application is the U.S. National Phase under 35 U.S.C. § 371 of International Application No. PCT/JP2015/078530, filed on Oct. 7, 2015, the entire contents of which is hereby incorporated by reference.

TECHNICAL FIELD

The present invention relates to a video display device that outputs a video to a display surface or a projection surface and a manipulation detection method used therefor.

BACKGROUND ART

In order to detect a manipulation performed by a user using a video display surface or a video projection surface as a manipulation surface, a method of imaging the manipulation surface through a camera and detecting motion of a hand or a finger of the user from a captured image is known. At this time, the manipulation surface is irradiated with two illumination lights, and thus it is possible to detect an approach degree or a contact point of the hand or the finger with respect to the manipulation surface from shapes of two shadows formed by the irradiation.

In this regard, a configuration in which, in a case in which a plurality of shadows formed by radiating light from a plurality of light sources are imaged through one camera, the camera images the shadows at a predetermined frame rate, and a different light source is selected for each frame from a plurality of light sources in synchronization with the frame rate of the camera and radiates light is disclosed in Patent Document 1.

CITATION LIST

Patent Document

Patent Document 1: JP 2012-68690 A

SUMMARY OF THE INVENTION

Problems to be Solved by the Invention

In a manipulation detection system based on imaging of a shadow, if a contrast of a shadow decreases, the accuracy of manipulation detection deteriorates. For example, as illustrated in FIGS. 17(*a*) and 17(*b*), in a case in which two illuminators 102 and 103 are turned on at the same time, the second illuminator 103 illuminates a shadow 302 of a finger 300 generated by the first illuminator 102, and thus the shadow imaged by a camera 101 becomes pale, and the contrast decreases. As illustrated in FIGS. 17(*c*) and 17(*d*), only one illuminator 103 is lighted up for comparison, and a contrast of a shadow 301 does not decrease.

According to the configuration of Patent Document 1, since a different light source is selected for each frame in synchronization with the frame rate of the camera and radiates light, the shadow is formed by only one selected illuminator, and thus it is possible to prevent the contrast from decreasing. However, in the case of a rolling shutter system in which a plurality of image sensors (imaging elements) are generally used in a camera to be used, shadows formed by a plurality of illuminators may be mixed in one frame image due to a shift of an exposure timing.

For example, a case in which two illuminators 102 and 103 are alternately lighted up in units of frames as illustrated in FIG. 18(*b*) by using an image sensor 400 illustrated in FIG. 18(*a*) is assumed. Since an exposure start timing is shifted along a scanning line 401 of the image sensor 400, images formed by irradiating of the two illuminators 102 and 103 are mixed in each of the frames 402 and 403. In other words, shadows imaged by the camera, that is, shadows 301 and 302 formed by the respective illuminators are mixed in the same frame and appear on both sides of the finger 300 as illustrated in FIG. 18(*c*).

The same applies to FIG. 19, and FIG. 19 illustrates shadows imaged by a camera 101 of a rolling shutter system by lighting up the two illuminators 102 and 103 alternately. FIGS. 19(*a*) and 19(*b*) illustrate a case in which the finger 300 is separated from a manipulation surface 201, and FIGS. 19(*c*) and 19(*d*) illustrate a case in which the finger 300 touches the manipulation surface 201. In both cases, since the two illuminators are switched in the same frame, shadows 301 and 302 formed by the respective illuminators separately appear on both sides of the finger 300 in the captured image.

In this regard, in manipulation detection, a moving image captured by a camera is analyzed, but it is desirable to complete an image to be handled in units of frames from a viewpoint of analysis accuracy. Therefore, when two shadow images are mixed in one frame, that is, when one shadow image is divided into two frames, it is an obstacle to analysis. As described above, when imaging is performed through the camera of the rolling shutter system, an image of a shadow which is formed by only one illuminator and desired to be extracted originally may not be obtained, and thus reliability of manipulation detection result decreases.

The present invention was made in light of the foregoing, and it is an object of the present invention to provide a manipulation detection method in which shadows of a plurality of illuminators are not mixed, and the contrast of the shadow does not decrease even in a case in which imaging is performed through the camera of the rolling shutter system and a video display device using the same.

Solutions to Problems

In order to solve the above problem, a video display device of the present invention includes first and second illuminators that irradiate a manipulation surface with illumination light for manipulation detection in different directions, an imaging unit that employs an imaging element of a rolling shutter system that images the manipulation surface irradiated with the illumination light together with a manipulation object of a user; and a contact point detecting unit that detects a contact point at which the manipulation object of the user touches the manipulation surface on the basis of a captured image of the imaging unit. Here, captured images of shadows of the manipulation object of the user formed by repeatedly lighting up the first illuminator and the second illuminator alternately are used in a contact point detection process of the contact point detecting unit, and in the alternate lighting of the first illuminator and the second illuminator, a lighting period of one illuminator is longer than an imaging cycle of one frame of the imaging unit.

Further, a manipulation detection method of the present invention includes a step of irradiating a manipulation surface with illumination lights for manipulation detection in different directions through by a first illuminator and a second illuminator, a step of imaging the manipulation surface irradiated with the illumination light together with a manipulation object of a user through an imaging unit that employs an imaging element of a rolling shutter system, and a step of detecting a contact point at which the manipulation object of the user touches the manipulation surface on the basis of a captured image of the imaging unit. Here, in the step of detecting the contact point, captured images of shadows of the manipulation object of the user formed by repeatedly lighting up the first illuminator and the second illuminator alternately are used, and in the step of irradiating with the illumination lights, a lighting period of one illuminator in the alternate lighting of the first illuminator and the second illuminator is longer than an imaging cycle of one frame of the imaging unit.

Effects of the Invention

According to the present invention, in a case in which manipulation detection is performed using a shadow imaged by a camera, it is possible to perform imaging so that shadows of a plurality of illuminators are not mixed, and the contrast of the shadow does not decrease. Accordingly, a manipulation detection process is stabilized, and the manipulation performance of the video display device is improved.

BRIEF DESCRIPTION OF THE DRAWINGS

FIG. 3 is a diagram illustrating an example of a shadow of a finger when the finger does not touch a manipulation surface.

FIG. 16 is a diagram illustrating an imaging operation in a sixth embodiment.

FIG. 18 is a diagram illustrating a reason why shadows of respective illuminators are mixed in a rolling shutter system.

FIG. 19 is a diagram illustrating an example in which shadows of respective illuminators are mixed.

MODE FOR CARRYING OUT THE INVENTION

Hereinafter, exemplary embodiments of the present invention will be described with reference to the appended drawings. Each embodiment will be described in connection with a configuration in which a manipulation of the user is detected using the camera of one rolling shutter system and two illuminators, and a video display unit is controlled on the basis of a detection result.

First Embodiment

Figure 1:
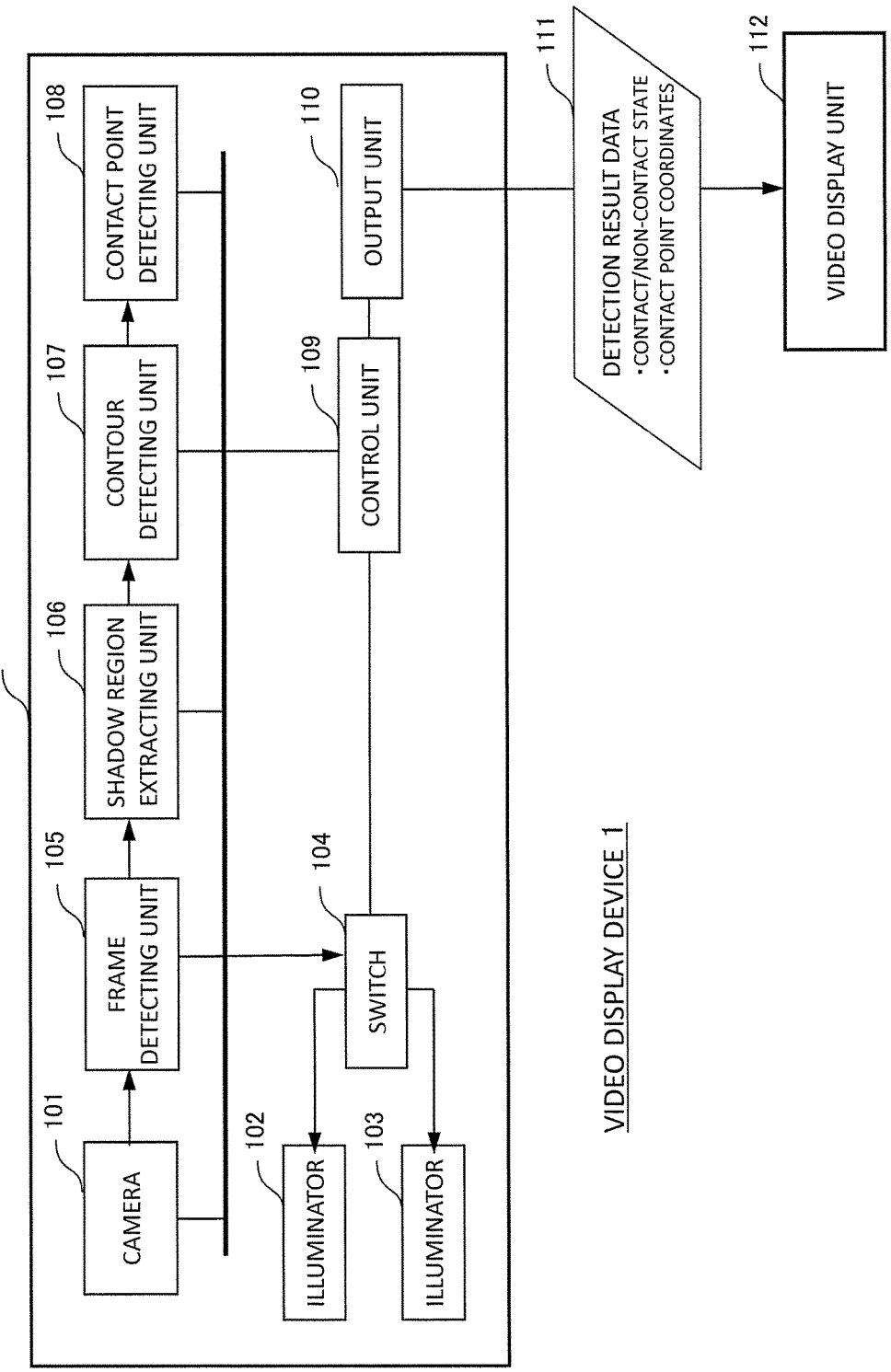
FIG. 1 is a diagram illustrating an overall configuration of a video display device in a first embodiment.

FIG. 1 is a diagram illustrating an overall configuration of a video display device in a first embodiment. The video display device is constituted by connecting a manipulation detecting unit 100 and a video display unit 112. The manipulation detecting unit 100 detects an approach degree, a contact point, or the like of the finger of the user serving as a manipulation object and the manipulation surface and transfers detection result data 111 to the video display unit 112.

The video display unit 112 is a projector that displays a video by projecting the video onto a projection surface, a display that displays a video on a display surface, a head mounted display, or the like, and controls switching, a display state, or the like of a video to be displayed on the basis of the detection result data 111 transferred from the manipulation detecting unit 100.

In the manipulation detecting unit 100, 101 indicates a camera, 102 and 103 indicate illuminators, 104 indicates a switch, 105 indicates a frame detecting unit, 106 indicates a shadow region extracting unit, 107 indicates a contour detecting unit, 108 indicates a contact point detecting unit, 109 indicates a control unit, and 110 indicates an output unit.

In FIG. 1, the units 101 to 110 are independent of each other, but they may be configured with one or a plurality of components if necessary. For example, 105 to 110 may be configured to perform a process through one or more central processing units (CPU). In FIG. 1, all the units 101 to 110 are installed inside the manipulation detecting unit 100, but one or more units may be installed outside the manipulation detecting unit 100 and connected to the manipulation detecting unit 100 via a network connection, a universal serial bus (USB) connection, or a wired or wireless connection.

The camera (imaging unit) 101 is constituted by an image sensor (imaging element), a lens, and the like of the rolling shutter system, and captures an image. The camera 101 may employ image sensors of other shutter systems as long as it is an image sensor whose exposure timing differs depending on a pixel line. In the present specification, all such shutter systems are referred to as a "rolling shutter system."

Each of the first illuminator 102 and the second illuminator 103 includes a light emitting diode, a circuit board, a lens, and the like, and radiate a region to be imaged by the camera 101. The camera 101 may be constituted by an infrared camera, the illuminator 102 and the illuminator 103 may be constituted by an infrared illuminator, and an infrared image may be captured to perform a process of detecting a state of a finger to be described later. Further, a light source of the illuminator may be a light source such as a laser other than a light emitting diode.

The switch 104 is constituted by a circuit board, software, or the like, and performs control such that the illuminator 102 and the illuminator 103 are lighted up or off on the basis of a signal transferred from the frame detecting unit 105. For example, in a case in which a signal A is transferred from the frame detecting unit 105, the first illuminator 102 is lighted up, and the second illuminator 103 is lighted off, and in a case in which a signal B is transferred from the frame detecting unit 105, the first illuminator 102 is lighted off, and the second illuminator 103 is lighted up.

The frame detecting unit 105 is constituted by a circuit board, software, or the like, and detects that imaging of one frame is completed by the camera 101 and transmits an illuminator switching signal to the switch 104 with a preset period. For example, in a case in which imaging of the number of frames imaged by the camera 101, that is, two frames is completed, switching is performed such that the signals A and B are alternately transmitted to the switch 104. A cycle with which the signal is switched in the frame detecting unit 105 is decided in accordance with a camera imaging cycle and an illuminator switching time.

The shadow region extracting unit 106 is constituted by a circuit board, software, or the like, and detects a shadow region from an image of a frame unit captured by the camera 101. For example, the shadow region is obtained by generating a difference image from a difference between a previously captured background image and a captured latest image and binarizing the difference image using a predetermined brightness threshold value. The process of the shadow region extracting unit 106 may be performed using other image processing algorithms for obtaining a similar result.

The contour detecting unit 107 is constituted by a circuit board, software, or the like and detects a contour of the shadow region obtained by the shadow region extracting unit 106. For example, the contour of the shadow region is obtained by first obtaining a pixel an upper left end of the shadow region and searching for adjacent pixels sequentially. The process of the contour detecting unit 107 may be performed using other image processing algorithms for obtaining a similar result.

The contact point detecting unit 108 is constituted by a circuit board, software, or the like and detects the contact point of the finger with respect to the manipulation surface on the basis of a shape or a position of the shadow.

The control unit 109 is constituted by a circuit board, software, or the like, and controls the camera 101, the first illuminator 102, the second illuminator 103, the switch 104, the frame detecting unit 105, the shadow region extracting unit 106, the contour detecting unit 107, the contact point detecting unit 108, and the output unit 110.

The output unit 110 is constituted by a network connection, a USB connection, an ultrasonic unit, an infrared communication device, or the like, and serves as an interface which can communicate with the video display unit 112.

The detection result data 111 is data which is output from the manipulation detecting unit 100 to the video display unit 112 via the output unit 110, and includes contact state information and contact point coordinates.

Figure 2:
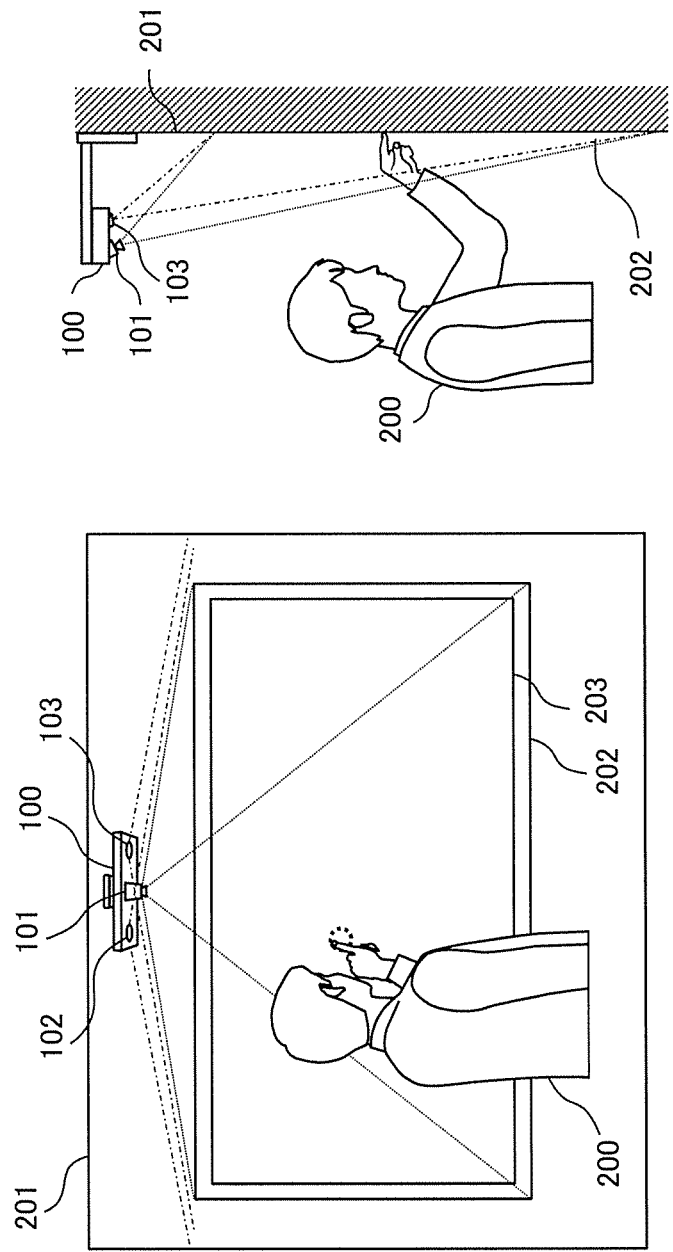
FIG. 2 is a diagram illustrating an overview of a manipulation detecting unit and an example of a state of a user at the time of manipulation.

FIG. 2 is a diagram illustrating an overview of the manipulation detecting unit 100 and an example of the state of a user 200 at the time of manipulation. As illustrated in FIGS. 2(a) and (b), the camera 101 images a range indicated by an imaging region 202 of a manipulation surface 201. Video can be displayed on the manipulation surface 201 through the video display unit 112 (not illustrated). In other words, the manipulation surface 201 is superimposed on the video display surface. The first illuminator 102 and the second illuminator 103 irradiate the manipulation surface 201 with illumination light for manipulation detection in different directions. In a case in which the user 200 touches the manipulation surface 201 with the finger in a manipulation region 203 in the imaging region 202, the manipulation detecting unit 100 detects a contact point.

As an example of the manipulation detection, a process of detecting the contact point of the finger will be described below with reference to the appended drawings. It will be appreciated that the manipulation object is not limited to the finger or the hand of the user, but a manipulation pen or the like can be used as well.

Figure 4:
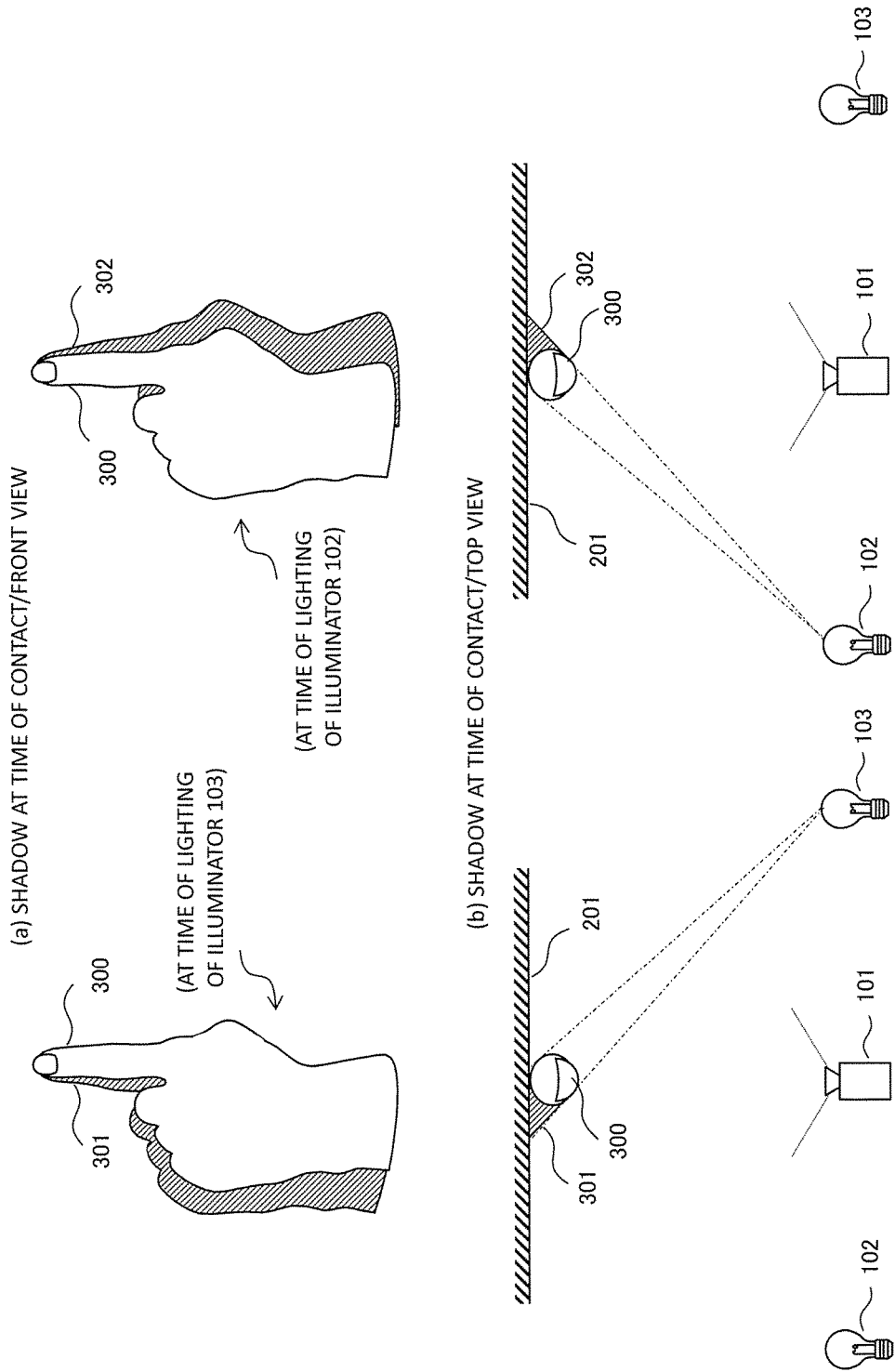
FIG. 4 is a diagram illustrating an example of a shadow of a finger when the finger touches manipulation surface.
Figure 5:
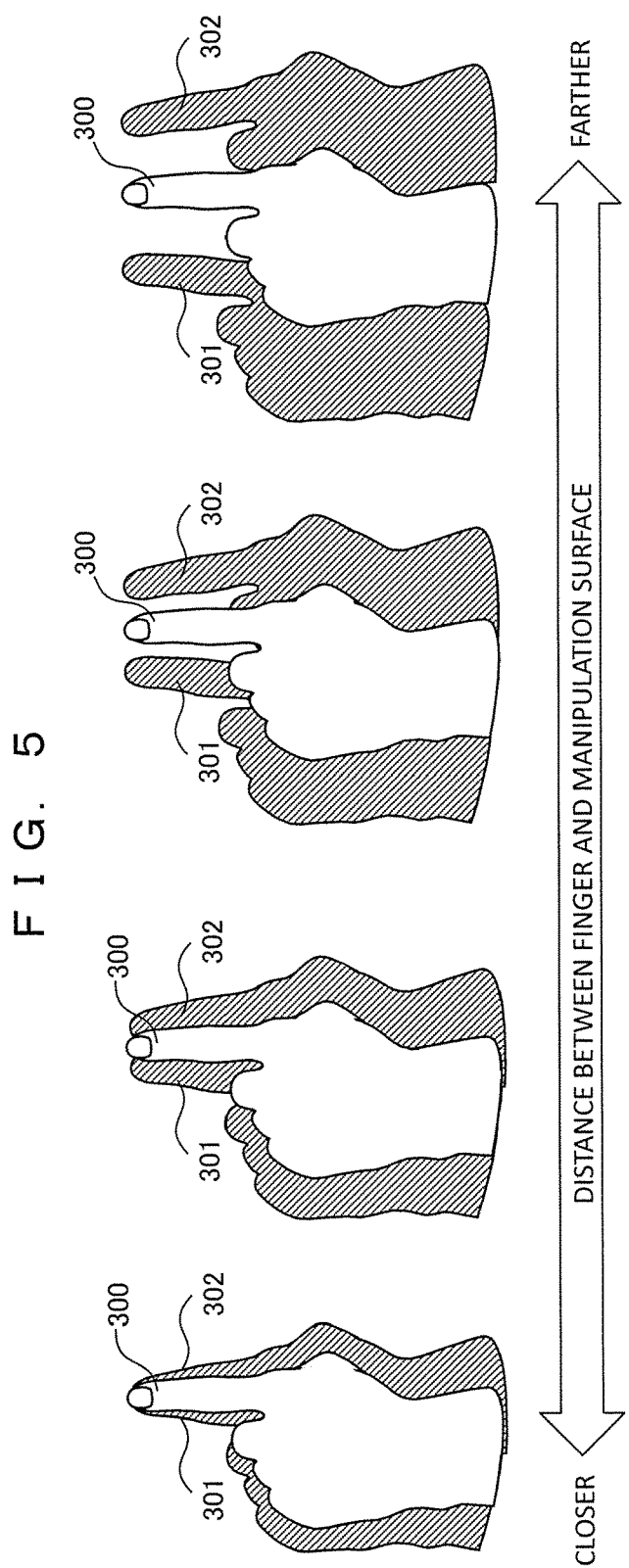
FIG. 5 is a diagram illustrating a change in a shadow according to a distance between a finger and a manipulation surface.

FIGS. 3 to 5 are diagrams illustrating examples of a difference in a shape of a shadow according to the presence or absence of a contact between a finger 300 and the manipulation surface 201 in a case in which the illuminator 102 or the illuminator 103 is lighted up.

FIG. 3(a) illustrates shadows in a case in which the finger 300 does not touch the manipulation surface 201. In a case in which the illuminator 103 is lighted up, a shadow 301 projected by the illuminator 103 is formed, and in a case in which illuminator 102 is lighted up, a shadow 302 projected by the illuminator 102 is formed, and thus the shadow 301 and the shadow 302 are separated from each other. FIG. 3(b) illustrates a principle of forming the shadows illustrated in FIG. 3(a). In a case in which viewed from the upper side of the projection surface, the light radiated by the illuminator 103 is blocked by the finger 300, and the shadow 301 is formed on the manipulation surface 201. Further, the light radiated by the illuminator 102 is blocked by the finger 300, and the shadow 302 is formed on the manipulation surface 201. Therefore, in the image captured by the camera 101, the shadow 301 and the shadow 302 are separated from each other.

On the other hand, FIG. 4(a) illustrates shadows in a case in which a fingertip of the finger 300 touches the manipulation surface 201. A shadow 301 and a shadow 302 are close to each other at a position of the fingertip of the finger 300. FIG. 4(b) illustrates a principle of forming the shadows illustrated in FIG. 4(a). In a case in which viewed from the upper side of the projection surface, the light radiated by the illuminator 103 is blocked by the finger 300, and the shadow 301 is formed on the manipulation surface 201. Further, the light radiated by the illuminator 102 is blocked by the finger 300, and the shadow 302 is formed on the manipulation surface 201. Therefore, in the image captured by the camera 101, the shadow 301 and the shadow 302 are close to each other at the position of the fingertip.

FIG. 5 virtually illustrates a form in which the shadow 301 and the shadow 302 are obtained with one image. In a case in which a distance between the finger 300 and the manipulation surface 201 is smallest, the shadow 301 and the shadow 302 are close to each other at the position of the fingertip. In a case in which the finger 300 and the manipulation surface 201 are separated, the distance between the shadow 301 and the shadow 302 gradually increases. In a case in which the distance between the finger 300 and the manipulation surface 201 is largest, the shadow 301 and the shadow 302 are separated from each other. As described above, the distance between the shadow 301 and the shadow 302 increases as the finger 300 gest away from the manipulation surface 201.

Figure 6:
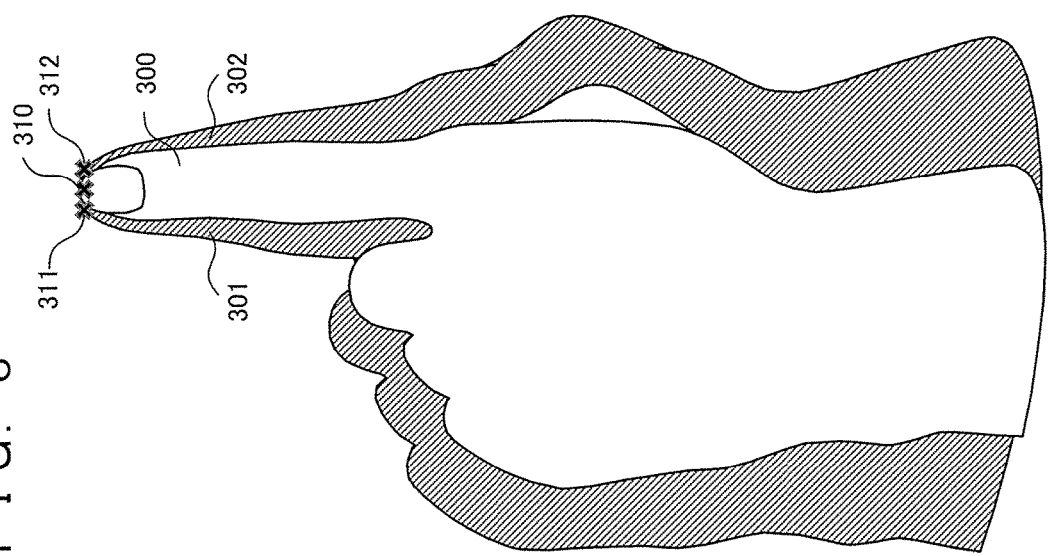
FIG. 6 is a diagram illustrating a method of detecting a contact point of a finger.

FIG. 6 illustrates a method of detecting the contact point of the finger with respect to the manipulation surface. First, the contour detecting unit 107 detects a leading end 311 of the shadow 301 of the finger 300 and a leading end 312 of the shadow 302. Then, the contact point detecting unit 108 calculates a distance between the leading end 311 of the shadow 301 and the leading end 312 of the shadow 302, and in a case in which the distance is equal to or less than a predetermined value, the contact point detecting unit 108 determines that the finger 300 touches the manipulation surface 201. Then, a middle point 310 between the leading end 311 and the leading end 312 is detected as the contact point between the finger 300 and the manipulation surface 201.

As described above with reference to FIGS. 18 and 19, in the case of the camera employing the image sensor (imaging element) 400 of the rolling shutter system, since the exposure start timing is shifted along the scan line of the image sensor, the shadows of the illuminators are mixed in the image of the frame unit captured by the camera, and there is a problem in that an image of a shadow which is desired to be extracted originally is unable to be obtained.

On the other hand, in the present embodiment, the illuminators to be lighted up are switched with a cycle of once per two frames, and control is performed such that it is not used for a frame image being captured when the illuminator is switched, and thus an image of a shadow formed by one illuminator is used. In other words, in the alternate lighting of the first illuminator and the second illuminator, a lighting period of one illuminator is set to be longer than an imaging cycle of one frame of the image sensor. Further, control is performed such that the switching of the illuminator is performed in accordance with a timing at which the exposure of a next frame image starts subsequently to a frame image which is not used.

Figure 7:
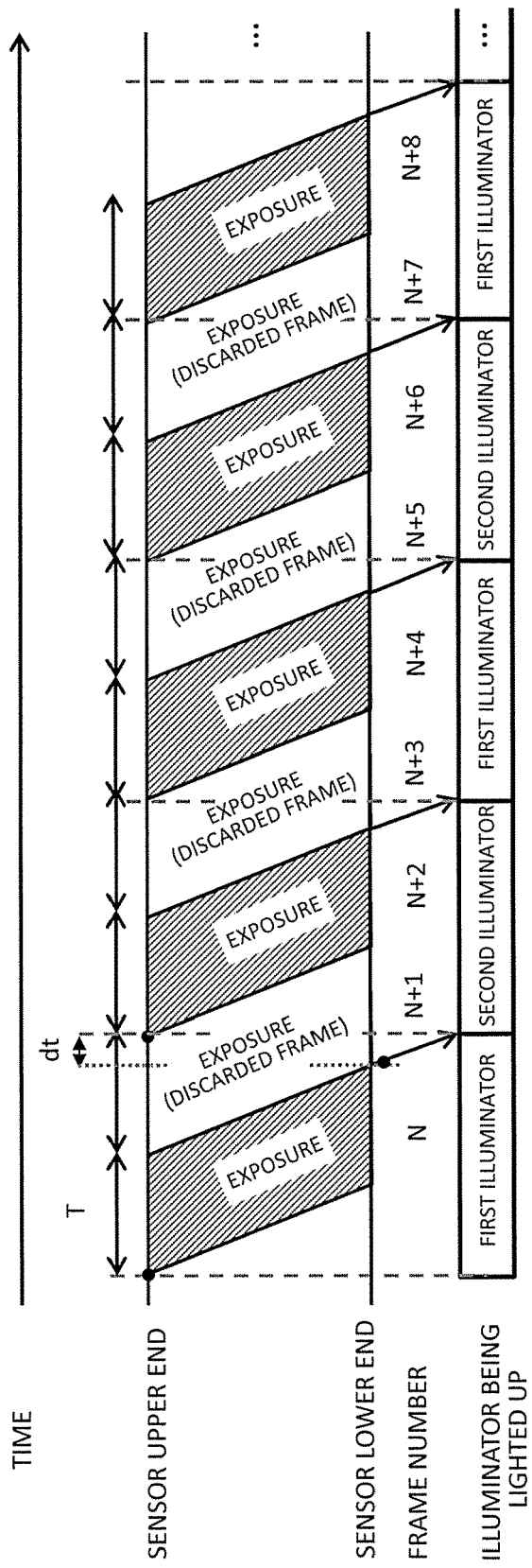
FIG. 7 is a diagram illustrating switching of an illuminator and a frame image to be used in the first embodiment.

FIG. 7 is a diagram illustrating an illuminator switching timing and a frame image to be used in the first embodiment. In the following description, each frame to be imaged is numbered, and the description will proceed with the passage of time. The imaging cycle (frame cycle) of one frame by the image sensor is indicated by T.

In a frame image N, the first illuminator is lighted up during the exposure time, and a frame image in which only the shadow formed by the first illuminator is shown is obtained in the frame image N. This image is valid, transmitted to the shadow region extracting unit 106, and used for shadow detection. If the frame detecting unit 105 detects the imaging completion of the frame image N, a signal for switching the illuminator to be lighted up is transmitted to the switch 104, and the second illuminator is lighted up in place of the first illuminator.

In the drawing, a symbol dt indicates a time required until the image sensor completes the imaging of the frame image N and then starts the exposure of a frame image (N+2). Hereinafter, the time dt is referred to as an "exposure switching time." The exposure switching time dt is decided in accordance with a shift amount of an exposure start timing of the scanning line at the upper end and the lower end in the image sensor. Therefore, a lighting start timing of the second illuminator is delayed by dt from an imaging completion timing of the frame image N. In other words, the illuminator switching timing is aligned with the exposure start timing for the next frame image (N+2).

At the time of switching to the second illuminator, the exposure of the next frame image (N+1) has already started, and the illuminator which is lighted up during the exposure switches from the first illuminator to the second illuminator, so that the shadows of the respective illuminators are mixed in the frame image (N+1). In other words, the frame image (N+1) is an invalid image which is not used, and the control unit 109 controls the shadow region extracting unit 106 such that the frame image (N+1) is not used (referred to as a "discarded frame"). Thereafter, the frame detecting unit 105 detects the imaging completion of the frame image (N+1) but causes the second illuminator to be continuously lighted up without transmitting the signal for switching the illuminator.

For the next frame image (N+2), only the second illuminator is lighted up during the exposure time, and a frame image in which only the shadow formed by the second illuminator is shown is obtained in the frame image (N+2). This image is valid, transferred to the shadow region extracting unit 106, and used for the shadow detection.

As described above, the shadow region extracting unit 106 extracts the shadow region using an image sequence obtained by thinning out the captured image in units of frames, frame images N, N+2, N+4, . . . , and then, the contour and the contact point are detected through the contour detecting unit 107 and the contact point detecting unit 108, respectively. According to this method, even in a case in which the camera performs imaging in synchronization with the two illuminators, and the shadow detection is performed, it is possible to obtain the frame image in which the contrast of the shadow is not damaged, and shadows of a plurality of illuminators are not mixed through the camera employing the image sensor of the rolling shutter system or the like, and it is possible to analyze the shadow using the frame image.

Figure 8:
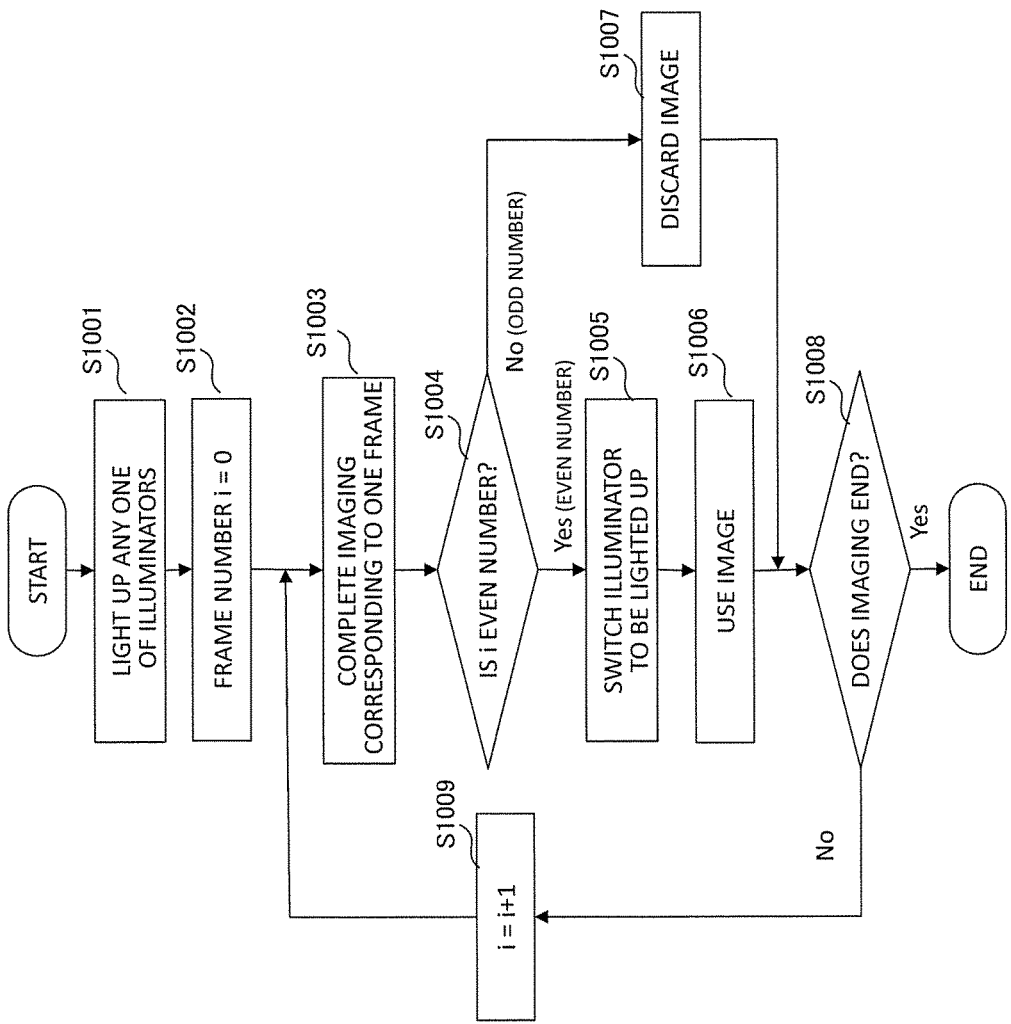
FIG. 8 is a flowchart illustrating lighting control of an illuminator and a frame image acquisition process.

FIG. 8 is a processing flow illustrating the lighting control of the illuminator and the acquisition of the frame image in the first embodiment. This process is controlled by the frame detecting unit 105.

In S1001, the illuminator 102 or the illuminator 103 is lighted up as an initial state. In S1002, a frame number i is initialized so that i=0.

In S1003, the camera captures one frame image, and the frame detecting unit 105 detects the imaging completion.

In step S1004, the frame detecting unit 105 determines whether or not the frame number i is an even number. In a case in which the frame number i is an even number, the process proceeds to S1005, and in a case in which the frame number i is an odd number, the process proceeds to S1007. Further, i=0 is determined to be an even number.

In S1005, the frame detecting unit 105 transmits the illuminator switching signal to the switch 104 and switches the illuminator to be lighted up. In S1006, the frame image (i: an even number) which has completed imaging at this time point is used by the shadow region extracting unit 106.

In S1007, the frame detecting unit 105 instructs the shadow region extracting unit 106 to discard the frame image (i: an odd number) which has completed imaging at this time point as the "discard frame."

In step S1008, it is determined whether or not imaging ends on the basis of the instruction or the like from the control unit 109, and in a case in which the imaging ends, the frame detecting unit 105 ends a series of processes. In a case in which the imaging does not end, the process proceeds to S1009.

In S1009, the frame number is incremented, and i=i+1. Then, the process returns to step S1003, and the next frame image is captured.

With the above processing flow, it is possible to implement the illuminator switching and the frame image acquisition illustrated in FIG. 7. In other words, the frame images N, N+2, N+4, . . . (N=0) in which the frame number i is an even number are used, and the frame images, in which the frame number i is an odd number, interposed therebetween are not used but discarded.

As described above, the exposure switching time dt from the imaging completion of the current frame to the exposure start of the next frame depends on the magnitude of the exposure timing shift of the scan line of the upper lower end in the rolling shutter system. On the other hand, even for the switching of the illuminator to be lighted up, instead of receiving the switching signal from the switch 104 and switching the two illumination lights instantaneously, a certain time width ds is necessary until the switching is completed after the switching starts. The time ds is referred to as an "illuminator switching time." Conditions for performing the switching of the illuminator illustrated in FIG. 7 in view of the switching times dt and ds will be described.

Figure 9:
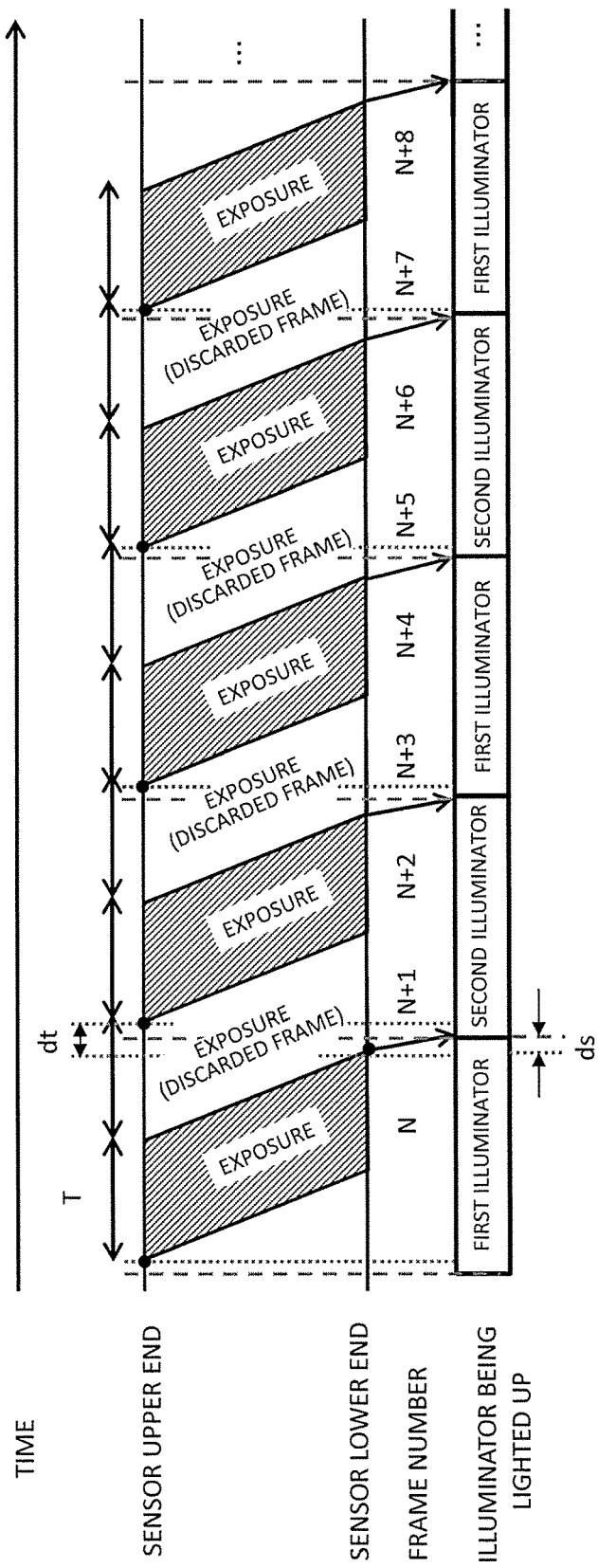
FIG. 9 is a diagram illustrating switching control of an illuminator in view of an illuminator switching time.

FIG. 9 is a diagram illustrating a illuminator switching timing in which the illuminator switching time ds is considered. A time required for switching from the first illuminator to the second illuminator is indicated by ds. It is necessary that the illuminator switching time ds is shorter than the exposure switching time dt from imaging completion of frame image N to the exposure start of the frame image (N+2). This is because if the illuminator switching time ds is longer than the exposure switching time dt, the shadow formed by the first illuminator is likely to be mixed in the exposure start portion of the frame image (N+2) to be used. As described above, since the switching to the second illuminator is caused to be completed earlier than the exposure start timing of the next frame image (N+2), it is possible to prevent the shadow images formed by the two illuminators from being mixed by causing the illumination light after the switching to radiate with a high degree of certainty.

As described above, in the first embodiment, in a case in which the contact of the finger is detected from two shadows related to the finger or the hand using one camera of the rolling shutter system and two illuminators, the imaging completion of the frame image of the camera is detected, and the illuminator to be lighted up is alternately switched each time imaging corresponding to two frames is completed. In other words, the lighting period of one illuminator when the two illuminators are alternately lighted up is set to be longer than the imaging cycle of one frame of the camera. Further, out of the two captured frames, the frame image in which the shadow images formed by the two illuminators are mixed is not used. Accordingly, the shadows formed by the two illuminators are not mixed in the frame image to be used, and the contrast of the shadow is not damaged. As a result, the contact point detection process by the manipulation detecting unit 100 is stabilized, and there is an effect in that the manipulation performance is improved in the video display device 1 equipped with this. In the present embodiment, since the frame image which is not used is one frame out of the two frames, the frame utilization rate can be regarded as being 50%.

In the above embodiment, the case in which the two illuminators are used has been described, but the present invention can be applied to cases in which three or more illuminators are used. In this case, it is desirable to sequentially switch the illuminator to be lighted up from among a plurality of illuminators and perform the imaging.

Second Embodiment

In a second embodiment, a case in which the illuminator switching time ds is longer than the exposure switching time dt from the frame image N to the frame image (N+2) will be described. In this case, since the switching of the illuminator is not aligned with the exposure start of the frame image (N+2), two or more frame images captured in a period before the switching of the illuminator is completed are not used.

Figure 10:
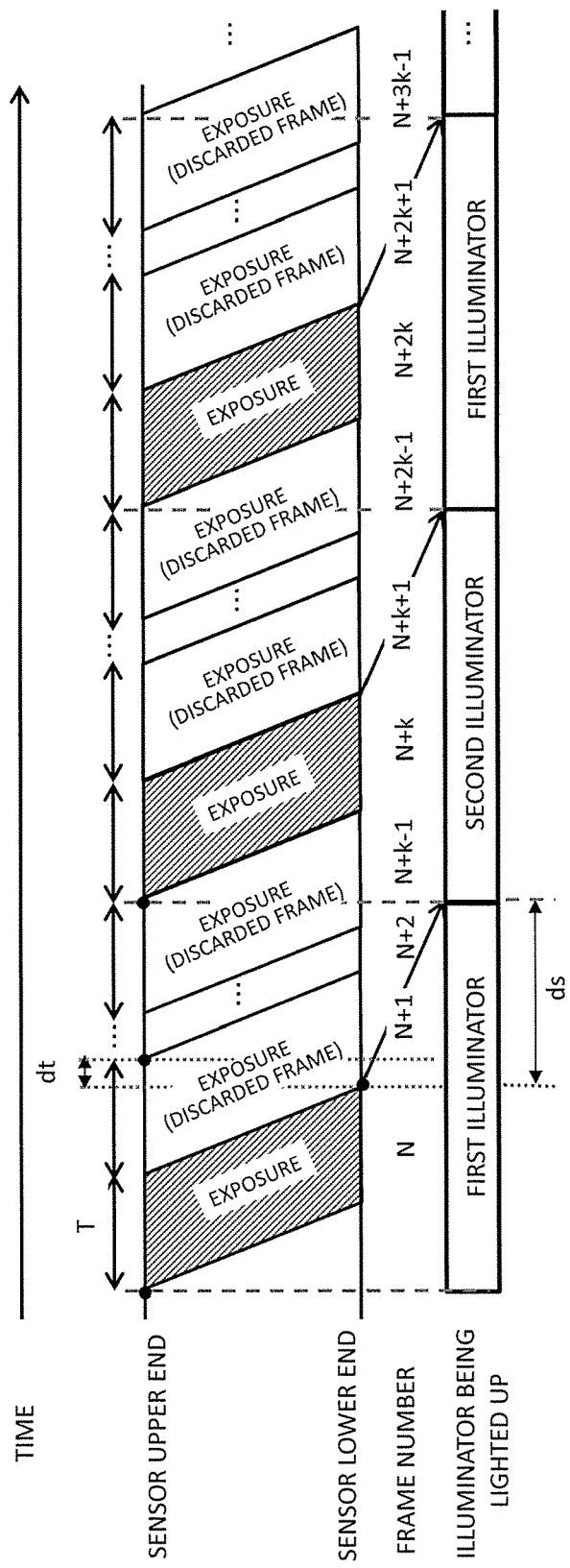
FIG. 10 is a diagram illustrating switching of an illuminator and a frame image to be used in a second embodiment.

FIG. 10 is a diagram illustrating an illuminator switching timing and a frame image to be used in the second embodiment. In this case, the illuminator switching time ds is long, and the switching is unable to be completed within the time dt before the exposure start of the next frame image (N+2). Therefore, the switching to the second illuminator is completed after capturing of a plurality of frame image is completed, and the frame image captured during that time is not used. In this example, a frame image (N+k) (here, k is an integer of 3 or more) is used next, and (k−1) frame images between a frame image (N+1) and a frame image (N+k−1) k−1) are not used. As a result, the utilization rate of the frame image is not a rate of one per two but a rate of one per k. A value of the parameter k is decided from a relation between the illuminator switching time ds and the frame cycle (imaging cycle) T as apparent from FIG. 10.

Figure 11:
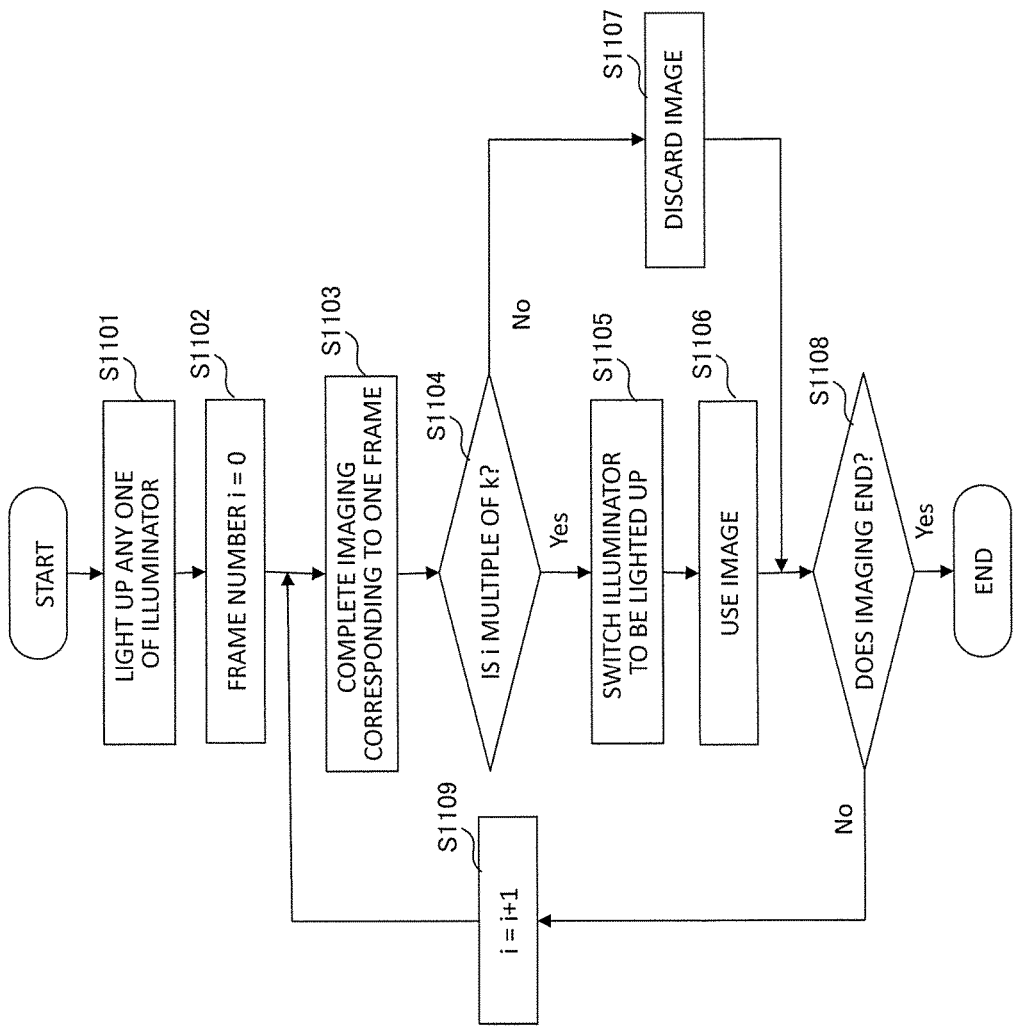
FIG. 11 is a flowchart illustrating lighting control of an illuminator and a frame image acquisition process.

FIG. 11 is a processing flow illustrating illuminator lighting control and frame image acquisition in the second embodiment. A difference from the first embodiment (FIG. 8) will be described. The value of the parameter k (≥3) is given in advance.

In S1104, the frame detecting unit 105 determines whether or not the frame number i is a multiple of k. In a case in which the frame number i is a multiple of k, the process proceeds to S1105, the illuminator is switched, and the image captured in S1106 is used. In a case in which the frame number i is not a multiple of k, the process proceeds to S1107, and the captured image is discarded. Further, i=0 is determined to be a multiple of k. The other processes are similar to those in FIG. 8.

With the above processing flow, it is possible to implement the illuminator switching and the frame image acquisition illustrated in FIG. 10. In other words, the captured frame images are used at the rate of one per k.

As described above, in the second embodiment, in a case in which the illuminator switching associated with the frame image capturing completion is not completed before the exposure start of the next frame image, the number of unused frame images is increased to two or more. In this case, the lighting period of one illuminator when the two illuminators are alternately lighted up is set to be longer than the imaging cycle of one frame of the camera. Accordingly, the same effects as in the first embodiment are obtained, the shadows formed by the two illuminators are not mixed in the frame image, and the contrast of the shadow is not damaged.

Third Embodiment

In a third embodiment, in a case in which the illuminator switching time ds is longer than the exposure switching time dt, an image in which the images formed by the two illuminators are not mixed is adaptively selected from the frame images captured before the switching of the illuminator is completed and used.

Figure 12:
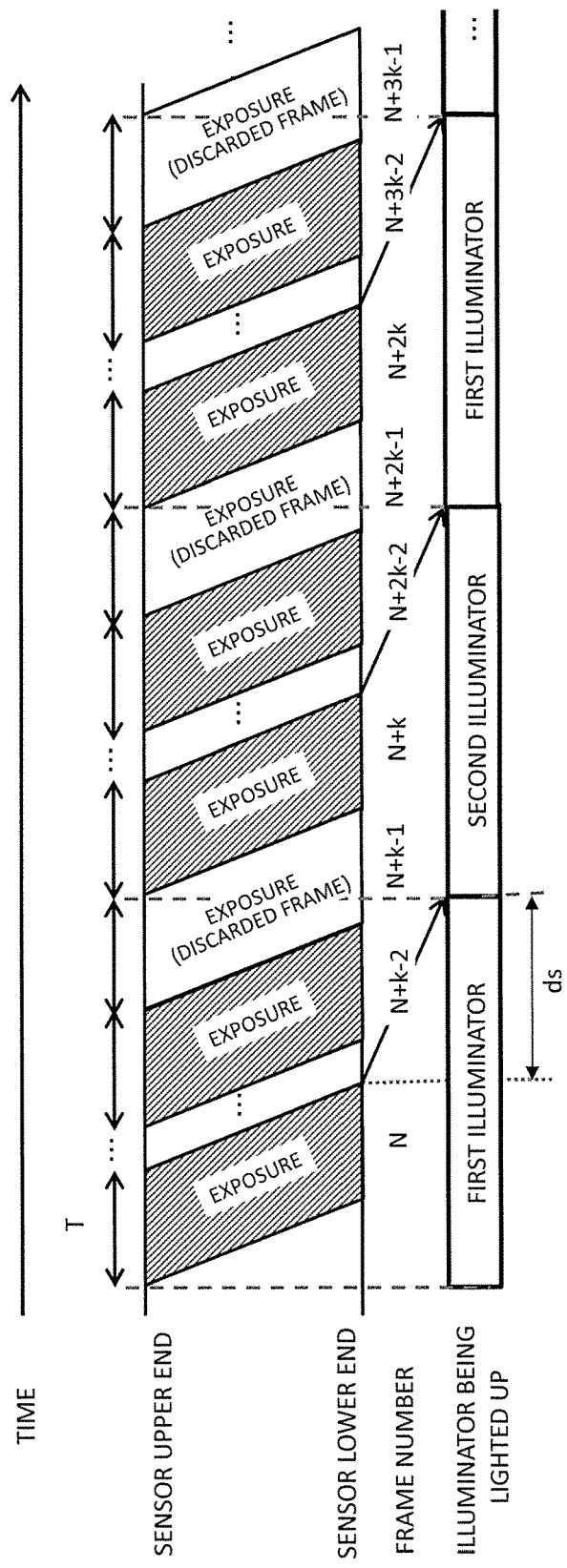
FIG. 12 is a diagram illustrating switching of an illuminator and a frame image to be used in a third embodiment.

FIG. 12 is a diagram illustrating an illuminator switching timing and a frame image to be used in the third embodiment. In this case, the second illuminator is assumed to be applied from frame image (N+k) (here, k≥3) due to the illuminator switching time ds. As a result, a frame image which is subsequent to the frame image N and exposed only by the first illuminator further exists, and in the present embodiment, the frame image is selected and used. In the case of this example, images of up to a frame image (N+k−2) can be used, subsequently to the frame image N. Then, an image (N+k−1) immediately before the frame image (N+k) in which the exposure is started by the second illuminator is not used because the two illuminators are mixed. In this case, the value of the parameter k is decided from a relation between the illuminator switching time ds and the frame cycle T, similarly to the second embodiment.

Figure 13:
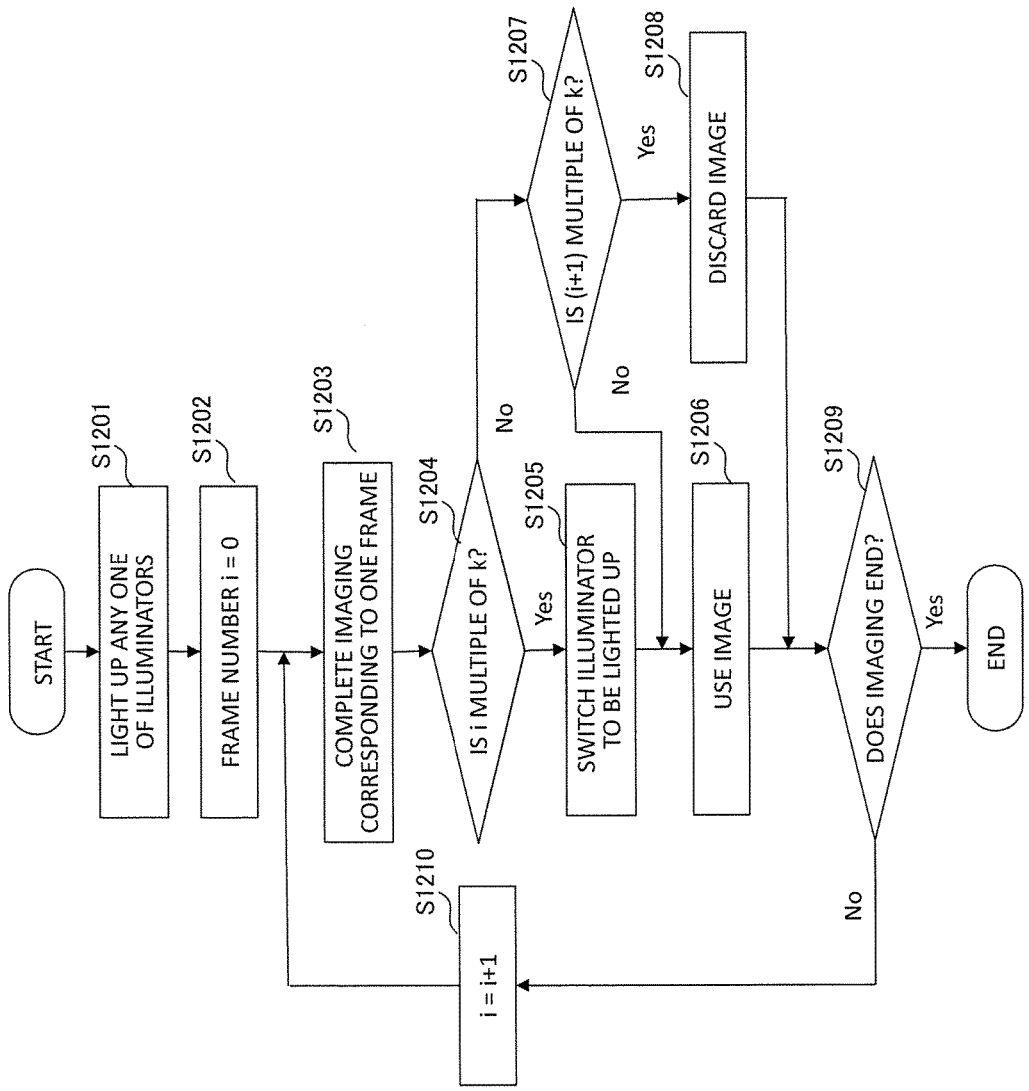
FIG. 13 is a flowchart illustrating lighting control of an illuminator and a frame image acquisition process.

FIG. 13 is a processing flow illustrating illuminator lighting control and frame image acquisition in the third embodiment. A difference from the second embodiment (FIG. 11) will be described. The value of the parameter k (≥3) is given in advance.

In S1204, the frame detecting unit 105 determines whether or not the frame number i is a multiple of k. In a case in which the frame number i is a multiple of k, the process proceeds to S1205, the illuminator is switched, and the image captured in S1206 is used. In a case in which the frame number i is not a multiple of k, the process proceeds to S1207.

In S1207, it is determined whether or not a frame number (i+1) is a multiple of k. In a case in which the frame number (i+1) is a multiple of k, the process proceeds to S1208, and the captured image is discarded. In a case in which the frame number (i+1) is not a multiple of k, the process proceeds to S1206, and the captured image is used. The other processes are similar to those in FIG. 11.

With the above processing flow, it is possible to implement the illuminator switching and the frame image acquisition illustrated in FIG. 12. In other words, (k−1) images among k captured frame images are used.

According to the third embodiment, the number of frame images to be used is (k−1) per k, and the utilization rate of the frame image is improved. As a result, a high dynamic range synthesis process or the like is performed using a plurality of frame images, and thus it is possible to further improve the contrast.

Fourth Embodiment

In a fourth embodiment, in a case in which the illuminator switching time ds is longer than the exposure switching time dt, the exposure time of the frame image not to be used is set to be longer than the exposure time of the frame image to be used.

Figure 14:
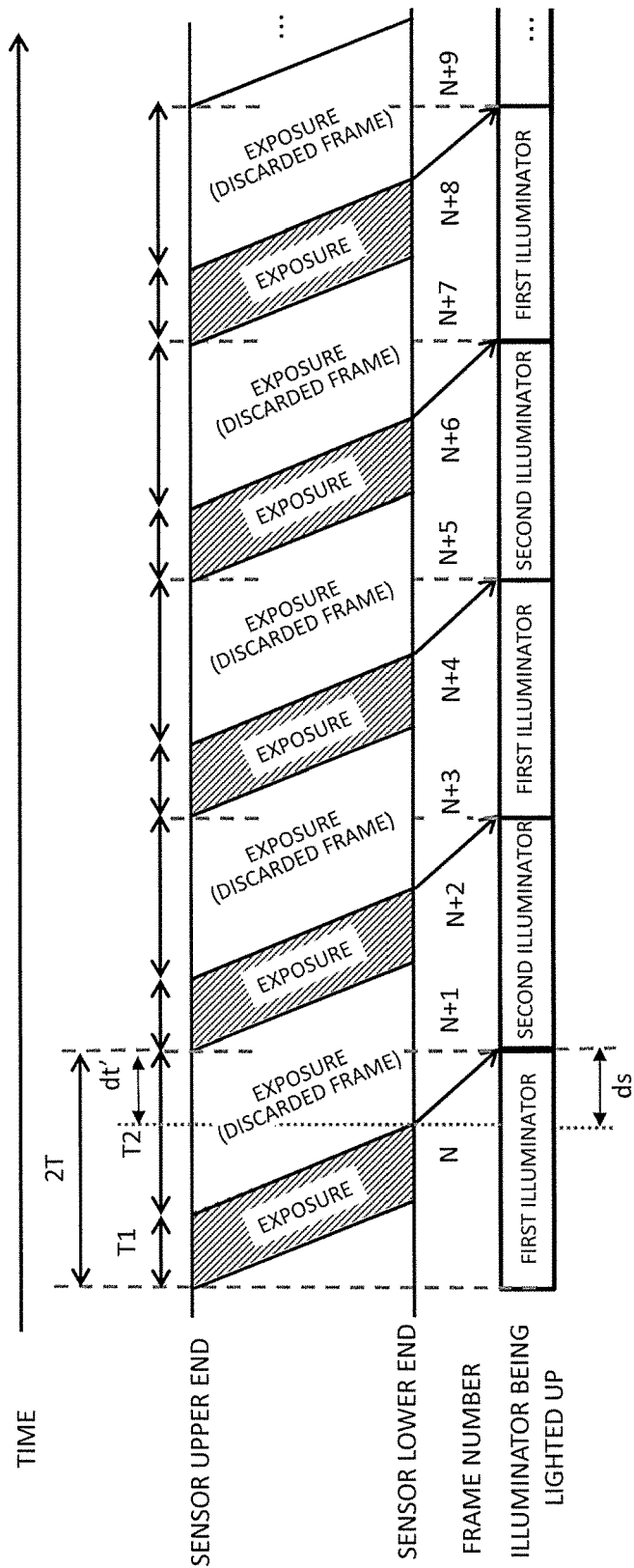
FIG. 14 is a diagram illustrating switching of an illuminator and a frame image to be used in a fourth embodiment.

FIG. 14 is a diagram illustrating a illuminator switching timing and a frame image to be used in the fourth embodiment. A difference from the first embodiment (FIG. 9) lies in that regarding the exposure time of the image sensor 400, an exposure time T1 of a frame image N to be used and an exposure time T2 of a frame image (N+1) not to be used are set to be different, and T2 is set to be longer than T1. As a result, the exposure switching time from imaging completion of the frame image N to the exposure start of the frame image (N+2) is increased to dt'. Then, if the increased exposure switching time dt' is set to be equal to or more than the illuminator switching time ds, the switching to the second illuminator can be completed at a time point at which the exposure of the frame image (N+2) starts.

Even in the fourth embodiment, the same effects as in the first embodiment can be obtained. In addition, since the captured frame images are used at a rate of one per two, the frame utilization rate similar to that of the first embodiment can be maintained. Furthermore, if values of the exposure times T1 and T2 are set so that T1+T2=2T, the imaging can be performed without changing an average frame rate of the image sensor 400.

Fifth Embodiment

In a fifth embodiment, a mixed part of the shadows formed by the two illuminators which is formed in a case in which the illuminator switching time ds is long is arranged outside the manipulation region of the user.

Figure 15:
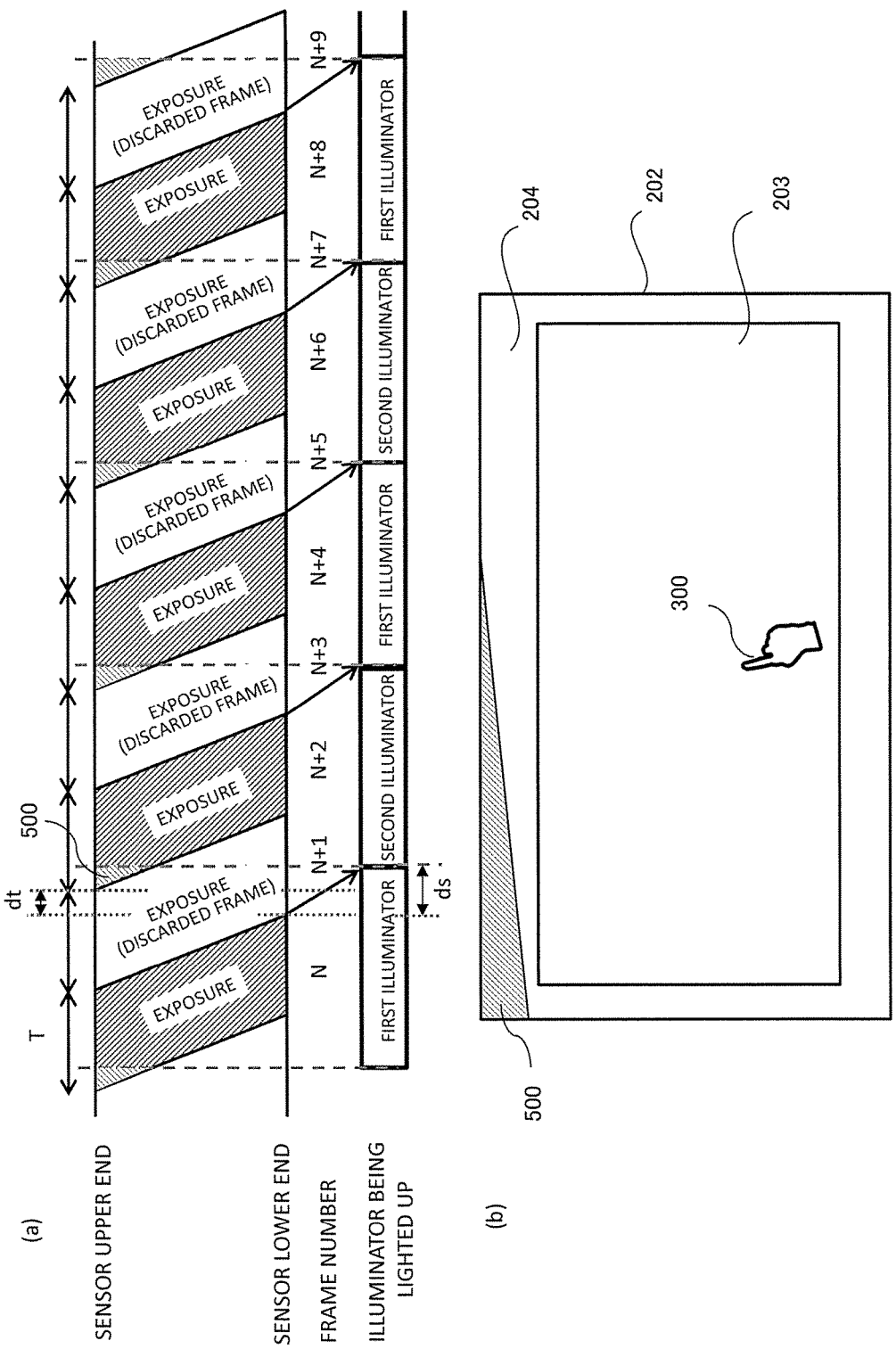
FIG. 15 is a diagram illustrating an imaging operation in a fifth embodiment.
Figure 17:
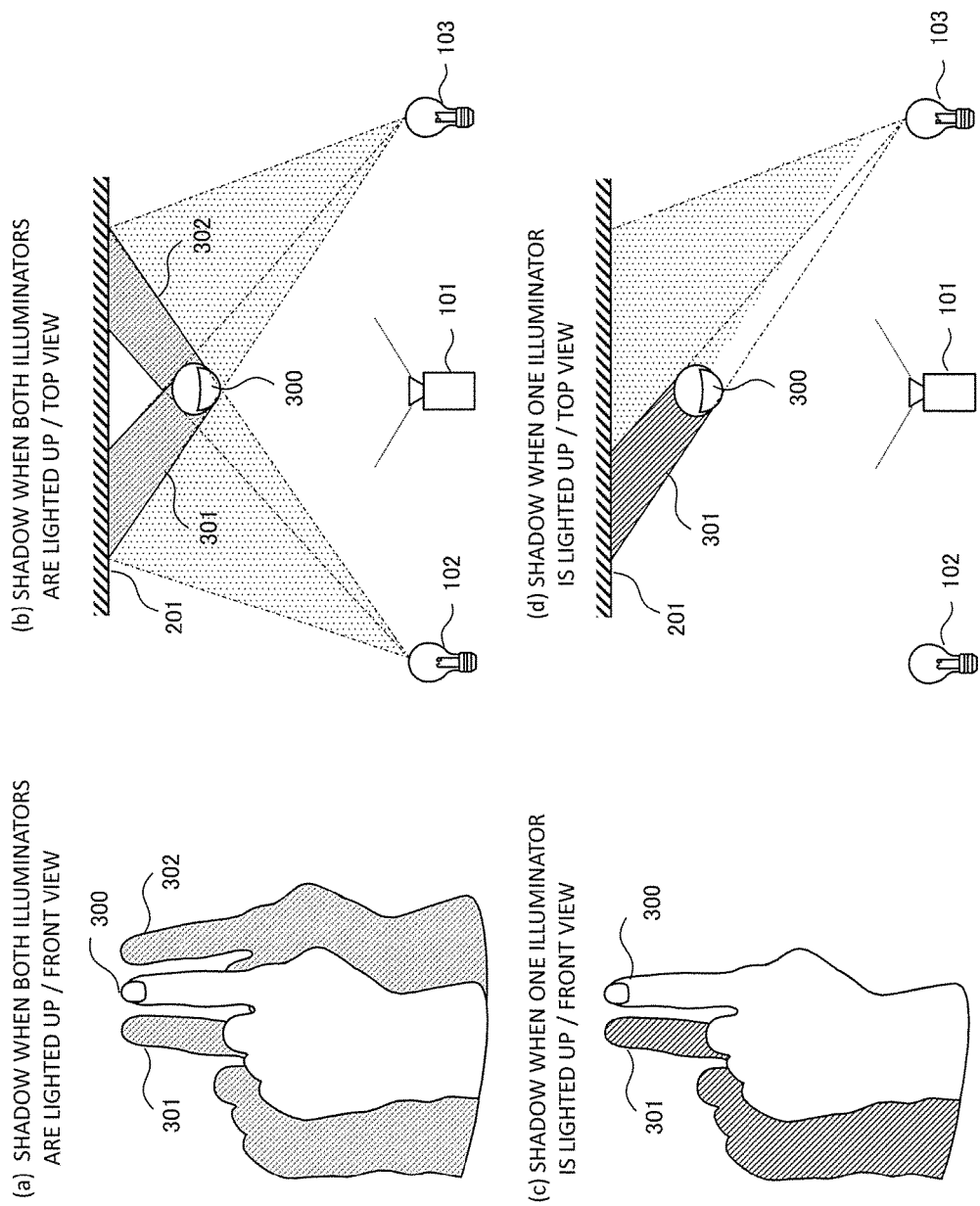
FIG. 17 is a diagram illustrating an example of a shadow in a case in which two illuminators are lighted up at the same time.

FIG. 15 illustrates an imaging operation in the fifth embodiment, (a) illustrates an illuminator switching timing and a frame image to be used, and (b) illustrates an imaging region on a manipulation surface and a manipulation region of the user.

In this case, as illustrated in FIG. 15(a), the illuminator switching time ds is assumed to be longer than the exposure switching time dt. As a result, a region 500 in which the shadows formed by the first illuminator and the second illuminator are mixed occurs immediately after the exposure of the frame image (N+2) starts. However, in the present embodiment, a frame image (N+2) having such a mixed region 500 is used under the following conditions.

FIG. 15(b) illustrates a relation between the imaging region 202 on the manipulation surface and the manipulation region 203 of the user. The imaging region 202 is a region which can be imaged by the camera, and the manipulation region 203 of the user is a region which can be manipulated by the finger 300 of the user. Normally, the imaging region 202 is set to be wider than manipulation region 203 so that the camera can image the entire manipulation region 203 of the user. In other words, a region 204 outside the manipulation region 203 is a region which is not used for the manipulation detection (a non-manipulation region).

In this regard, in the present embodiment, a region 500 in which the two illuminators illustrated in FIG. 15(a) are mixed is arranged in the non-manipulation region 204 in FIG. 15(b). The mixed region 500 has a triangular shape on the manipulation surface, and a size of the region 500 is decided in accordance with a difference (ds-dt) between the illuminator switching time ds and the exposure switching time dt. Therefore, if the difference (ds-dt) is small, it is sufficiently possible to accommodate the mixed region 500 in the non-manipulation region 204. As a result, in the manipulation region 203 of the user, a normal image is obtained by only one illuminator, and there is no problem in the manipulation detection process.

According to the fifth embodiment, even in a case in which the illuminator switching time ds is longer than the exposure switching time dt, the frame not to be used can be set at the rate of one per two, and it is possible to prevent the reduction in the utilization rate of the frame image.

Sixth Embodiment

A sixth embodiment is a modified example of the fifth embodiment and relates to a configuration in which a direction of the image sensor is appropriately changed to perform imaging, and a mixed portion of the shadows formed by the two illuminators is adaptively arranged outside the manipulation region of the user. The non-manipulation region 204 in FIG. 15(b) is formed depending on a position relation between the imaging region 202 of the camera and the manipulation region 203 of the user. For example, a configuration suitable for a case in which the manipulation region 203 has a trapezoidal shape, and a large non-manipulation region 204 is formed at the lower end of the manipulation surface will be described.

FIG. 16 illustrates an imaging operation in the sixth embodiment, Fig. (a) illustrates an illuminator switching timing and a frame image to be used, and FIG. 16(b) illustrates the imaging region on the manipulation surface and the manipulation region of the user.

This example will be described in connection with a case in which the manipulation region 203 of the user has a trapezoidal shape, and a non-manipulation region 204 larger than an upper end side is formed on the lower end side of the manipulation surface as illustrated in FIG. 16(b). In this case, it is desirable to arrange the mixed region 500 of the two illuminators below the imaging region 202. To this end, it is desirable to cause the exposure starting point at which the mixed region 500 is formed to be moved to the lower side of the imaging region, and in this example, the image sensor used in FIG. 15 is caused to rotate 180°. As a result, the scanning start point by the image sensor is a lower right corner.

FIG. 16(a) illustrates the illuminator switching timing, but as compared with FIG. 15 (a), a difference lies in that the exposure direction is apparently directed from the sensor lower end toward the sensor upper end, and the mixed region 500 is formed at the sensor power end position. The switching of the illuminator and the frame to be used are similar.

As described above, in a case in which the non-manipulation region 204 is largely formed below the manipulation surface, the direction of the image sensor is reversed and upside down, and thus there is an effect in that it is possible to accommodate it even when the illuminator switching time ds is long, and the mixed region 500 of the two illuminators is large. The direction of the image sensor may be adaptively caused to rotate an arbitrary angle in accordance with the direction in which the non-manipulation region 204 is maximized, and in this case, similar effects are obtained.

In the sixth embodiment, even in a case in which the illuminator switching time ds is longer than the exposure switching time dt, the frame not to be used can be set at the rate of one per two, and it is possible to prevent the reduction in the utilization rate of the frame image.

The exemplary embodiments of the present invention have been described above, but the present invention is not limited to the above-described embodiments but includes various modified examples. For example, the above-described embodiments have been described in detail in order to facilitate understanding of the present invention and are not necessarily limited to those having all the components described above. For example, it is possible to replace a part of a configuration of a certain embodiment with a configuration of another embodiment, and it is also possible to add a configuration of another embodiment to a configuration of a certain embodiment. It is also possible to perform addition, deletion, and replacement of configurations of other embodiments on a part of the configurations of each embodiment.

REFERENCE SIGNS LIST 1 video display device
100 manipulation detecting unit
101 camera (imaging unit)
102 first illuminator
103 second illuminator
104 switch
105 frame detecting unit
106 shadow region extracting unit
107 contour detecting unit
108 contact point detecting unit
109 control unit
110 output unit
111 detection result data
112 video display unit
200 user
201 manipulation surface
202 imaging region
203 manipulation region
204 non-manipulation region
300 finger (manipulation object)
301, 302 shadow
310 contact point
400 image sensor (imaging element)
500 multi-illuminator mixed region
T frame cycle (imaging cycle)
dt exposure switching time
ds illuminator switching time

The invention claimed is:

1. A video display device that displays a video on a video display surface and is able to detect a manipulation performed on a manipulation surface superimposed on the video display surface by a manipulation object of a user, comprising:
   first and second illuminators that irradiate the manipulation surface with illumination light for manipulation detection in different directions;
   an imaging unit that employs an imaging element of a rolling shutter system that images the manipulation surface irradiated with the illumination light together with the manipulation object of the user; and
   a contact point detecting unit that detects a contact point at which the manipulation object of the user touches the manipulation surface on the basis of a captured image of the imaging unit,
   wherein captured images of shadows of the manipulation object of the user formed by repeatedly lighting up the first illuminator and the second illuminator alternately are used in a contact point detection process of the contact point detecting unit, and
   in the alternate lighting of the first illuminator and the second illuminator, a lighting period of one illuminator is longer than an imaging cycle of one frame of the imaging unit,
   wherein, in a case in which there is a non-manipulation region which is not manipulated by the manipulation object of the user in an imaging region by the imaging unit on the video display surface,
   an imaging position at which lighting switching between the first illuminator and the second illuminator is completed during imaging by the imaging unit is arranged in the non-manipulation region,
   wherein the first illuminator, the second illuminator, and the imaging unit are installed on an upper side of the video display surface, and
   in a case in which the non-manipulation region by the user exists on a lower side of the video display surface, the imaging element of the imaging unit is rotated, and an imaging start position is set on the lower side of the video display surface.

2. The video display device according to claim 1, wherein image capturing completion of each frame of the imaging unit is detected, and the lighting of the first illuminator and the second illuminator is switched each time imaging of two frames is completed, and
   in the contact point detection process, an image of a frame unit irradiated with only the illumination light of one of the first illuminator and the second illuminator is used, but an image of a frame being imaged when the lighting of the illuminator is switched is not used.

3. The video display device according to claim 1, wherein image capturing completion of each frame of the imaging unit is detected, and the lighting of the first illuminator and the second illuminator is switched each time imaging of k (k is an integer of 3 or more) frames is completed, and in the contact point detection process, an image of a frame unit irradiated with only the illumination light of one of the first illuminator and the second illuminator is used, but images of a plurality of frames being imaged before illuminator switching is completed after the illuminator switching starts with detection of the image capturing completion are not used.

4. The video display device according to claim 1, wherein image capturing completion of each frame of the imaging unit is detected, and the lighting of the first illuminator and the second illuminator is switched each time imaging of k (k is an integer of 3 or more) frames is completed, and in the contact point detection process, images of a plurality of frames imaged before illuminator switching is completed after the illuminator switching starts with detection of the image capturing completion are used, and an image of a frame being when the illuminator switching is completed is not used.

5. The video display device according to claim 2, wherein the imaging unit causes an exposure time for an image of a frame to be used in the contact point detection process to be different from an exposure time for an image of a frame not to be used, and sets an average frame rate to a predetermined value.

* * * * *